April 1, 1930.  E. C. DICKEY  1,753,082
BROODER HOUSE
Filed June 16, 1927   3 Sheets-Sheet 1

Inventor:
Elmer C. Dickey,
by Jas. L. Skidmore
Att'y.

April 1, 1930. E. C. DICKEY 1,753,082
BROODER HOUSE
Filed June 16, 1927 3 Sheets-Sheet 2
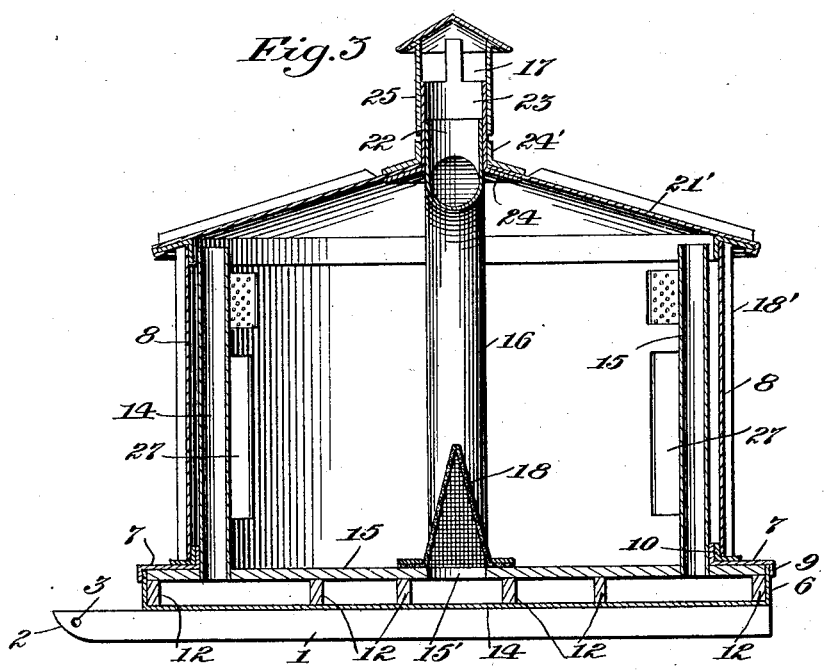
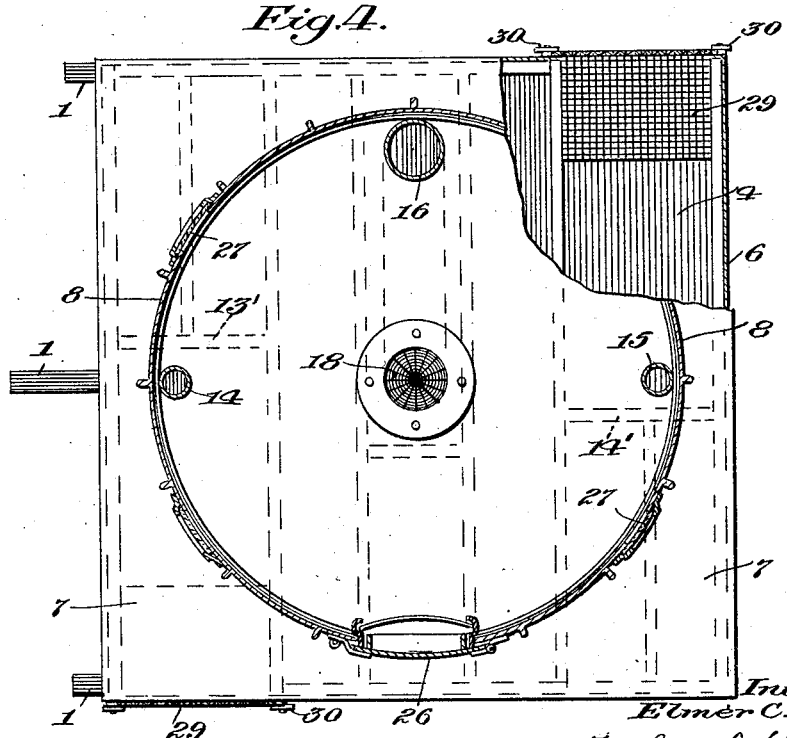
Inventor:
Elmer C. Dickey,
by Jas. L. Skidmore
Att'y April 1, 1930.　　　　E. C. DICKEY　　　　1,753,082
BROODER HOUSE
Filed June 16, 1927　　3 Sheets-Sheet 3
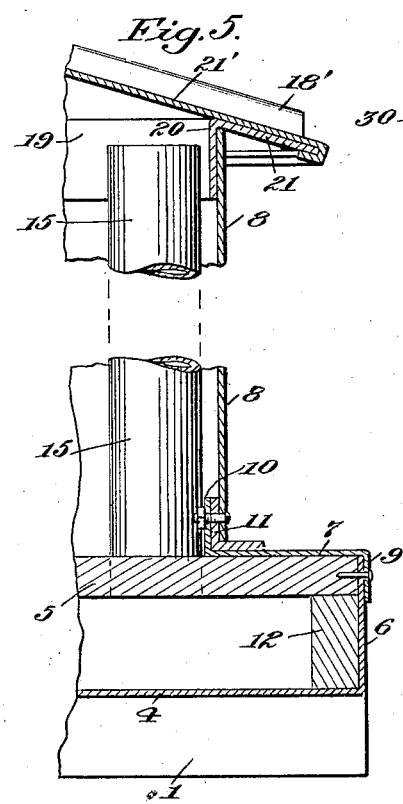
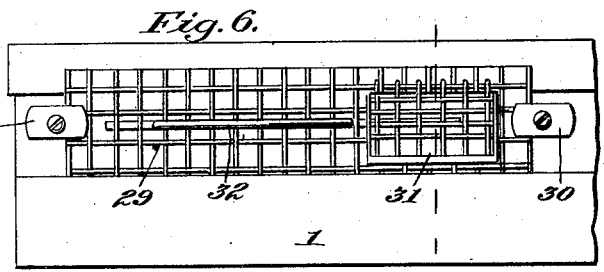
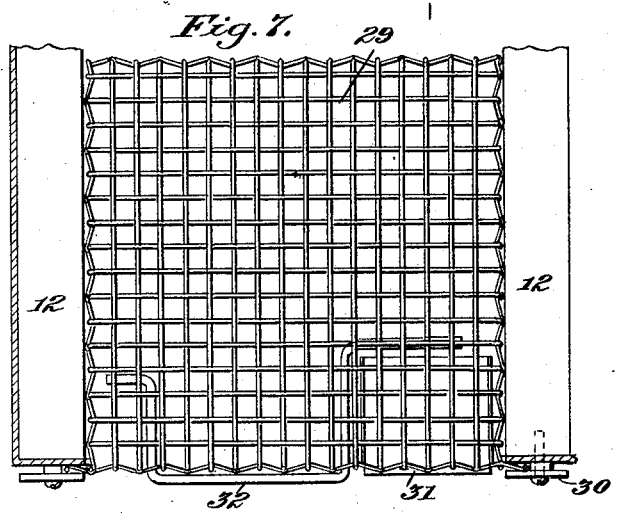
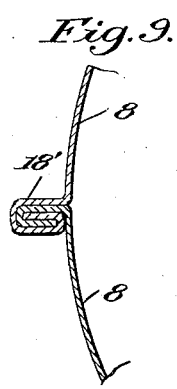
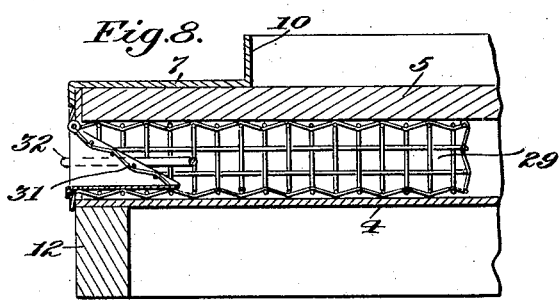
Inventor:
Elmer C. Dickey,
by Jas. L. Skidmore
Att'y.

Patented Apr. 1, 1930

1,753,082

UNITED STATES PATENT OFFICE

ELMER C. DICKEY, OF KOKOMO, INDIANA

BROODER HOUSE

Application filed June 16, 1927. Serial No. 199,245.

This invention relates to an improved and novel brooder house, especially designed for caring for and the protection of small chicks whereby they will be safely and comfortably protected and maintained in a healthy condition.

The prime object of the invention is to provide a simple, economical, durable, and thoroughly efficient brooder house which is constructed substantially air tight, waterproof and fire-proof.

Another object of the invention is to provide a ventilating system in connection with my improved brooder house, said system being so installed that it furnishes the desired amount of fresh air at all times with no direct draft, and without letting any of the heat out, thus maintaining an even, balanced draft, and a substantially uniform temperature within the structure.

Another object of the invention is to so construct the brooder house that it may readily be moved from place to place according to the desire of its owner.

Further objects of the invention are to so construct the novel brooder house that it will be rat-proof; that it will be properly lighted and ventilated; that the use of the numerous securing bolts and screws may be dispensed with; that it is of circular formation, hence is free from corners within which the chicks might crowd and be trampled; that the draft of air is from beneath the floor and is discharged at the top portion of the house; that the floor joists or supporting means are so blocked off that the air feed is directed to the intake air tubes or pipes, and that it may easily and readily be maintained in a clean and sanitary condition.

The foregoing and such other objects as may appear from the ensuing description are accomplished by the construction, arrangement, location and combination of the several parts hereinafter more fully described, illustrated in the accompanying drawing, and particularly pointed out in the claims appended hereto, it being understood that slight changes in the precise form, proportions and minor details of construction may be resorted to without departing from the spirit or sacrificing any of the advantages of the invention.

In the accompanying drawings forming a part of this specification it will be seen that:

Figure 3 is a central sectional elevation of the same.

Figure 4 is a horizontal section taken through the body portion of the house looking toward its base member.

Figure 5 is sectional elevation of a portion of the structure showing the house and one of the air intake pipes broken away.

Figure 6 is an elevation of a portion of the base member broken away, showing a rat-trap secured thereto.

Figure 7 is a plan of a portion of the base member partly in section and broken away below the flooring showing the rat-trap secured within the base.

Figure 8 is a detail section of a portion of the base member broken away, showing the rat-trap within the base with its door in the normally closed position, and Figure 9 is a detail section of the metallic seam used in the construction of the housing proper and roofing.

Figure 1:
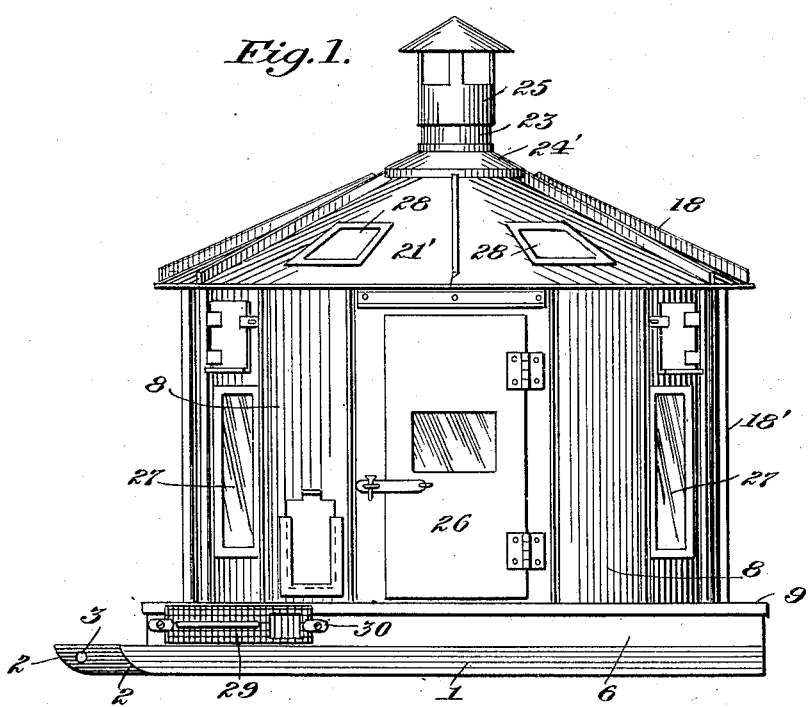
Figure 1 is an outside elevation of the improved brooder house embodying my invention.
Figure 2:
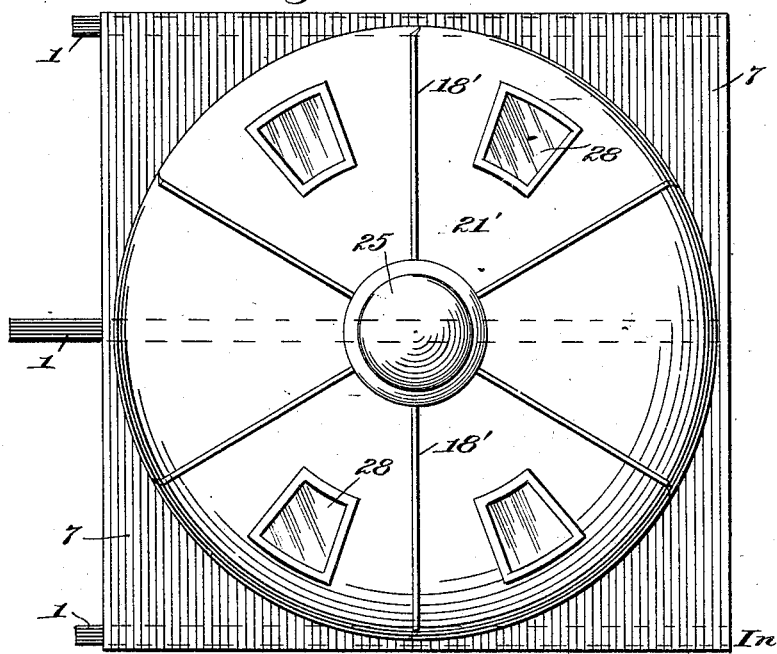
Figure 2 is a plan of the same looking down on the top thereof.

In the embodiment of this invention as illustrated it will be seen that the numeral 1 designates a plurality of sled runners formed of any suitable or desirable material, each of said runners being provided with an upward and outwardly tapered end 2, having an opening 3 formed therethrough for the reception of suitable means for hauling the house from one place to another, and fixedly seated upon said runners is a large galvanized iron pan 4 of substantially the same dimensions as the flooring 5, the rim portion 6 of said pan terminating flush with the upper surface of the flooring. A comparatively heavy sheet metal member 7 is formed to cover the flooring outside of the upright body member 8, said member 7 being formed with an outer depending rim portion 9 adapted to overlap the upper edge of the pan 4, and the member 7 and the pans being both fixedly secured to the peripheral edge of the flooring 5, while the inner edge of the circular portion of the member 7 is formed with an upwardly extending rim member 10 disposed within said upright body member 8, and an annular angle iron 11 is seated upon the upper face of the member 7, with its upright portion in contact with the outer face of the rim 10 of said member 7, the lowermost edge of the upright body member 8 being seated upon the laterally extended flange of the angle iron 11 to which iron and upright of the member or metal plate 7 the said body member is fixedly and rigidly secured in any suitable manner. Seated upon the pan 4 is a series of joists 12 to which the flooring is fixedly secured, and said joists are so disposed between the pan 4 and flooring as to block the flow of air at the points 13' and 14', shown by the dotted lines in Fig. 4, thus directing the fresh air to the intake pipes 14 and 15 disposed at each side of and within the upright portion of the housing and discharging said air at the top portion of the housing where it freely mixes with the warm air and is tempered to the heat within and is drawn downward through a central opening 15' formed in the flooring by the rear draft flue 16, and is led to the central top outlet 17, thus the flooring is always kept comparatively warm, the desired amount of fresh air is furnished at all times without any direct draft, hence the chicks are prevented from catching a cold which now kills a large percentage of the chickens hatched.

While a cone-shaped open wire cover 18 is shown above the central opening formed through the floor, it will be obvious that a flat open wire covering may be employed, as being well adapted to close the opening to prevent the small chicks from falling therethrough, and at the same time permit the air to be drawn from the inside of the house and beneath the flooring by the rear upright flue 16 leading to the central outlet 17 formed in the roof of the housing.

The entire upright housing and the roof are preferably formed of metal preferably of galvanized iron or suitable heavy sheet metal, the sheets of metal being joined together for the formation of the desired circular formation of the housing and roof by tightly compressing the ends of the sheets together forming a jointed seam 18' which includes five thicknesses of the metal employed, thereby constituting a strong, durable, waterproof and air-tight joint wherever the sheets are joined in the construction of the housing and roofing.

By reference to Figs. 3 and 5 of the drawings, it will be seen that in forming the roof sheets of heavy metal 19 are formed with a rim portion 20 depending in contact with the inner face of the upright housing 8, each sheet being provided with a laterally and downwardly extending portion 21, and each sheet of metal 21' forming the roofing is bent downwardly and inwardly embracing the outer edge of the said portion 21, each of said sheets 19 being fixedly and rigidly secured to the upright housing in any suitable manner.

The central air outlet pipe 22 terminates within a collar 23 terminating at its lower end with a laterally and downwardly extended flange 24, the inner edge of each sheet of roofing resting upon said flange to which it is preferably soldered to make it air-tight, and on the outer face of the roof surrounding said collar 23 and outlet pipe 22 is another collar 24' of heavy sheet iron which is fixedly secured around the inner circular edges of the roof, and surrounding the collar 23 and the outer end of the pipe 22 is an ordinary galvanized iron cap 25.

The housing is provided with a suitable constructed air-tight door 26, and the body portion of the housing is formed with any desirable number of panes 27 of glass, fitted in air-tight condition to furnish the desired light within the structure, and a plurality of glass panes 28 may also be fitted in an air-tight manner in the roof of the structure.

Diagonally disposed at opposite sides or ends of the base portion of this structure beneath the flooring 5 and above the pan 4 are the rat-traps 29, each trap being removably secured within said base portion by a plurality of rotatable elongated buttons 30 fixedly secured to the base, and composed of heavy wire, with a suitable doorway 31 at its outer end adapted to swing inwardly and drop by gravity into its normal closed position, and suitably secured to the front portion of each trap is a bail or handle member 32 by which, when the tray is released by the turning of the securing buttons, the trap is lifted out, the doorway is locked by the outward movement of the said bail or handle, and the trap may be placed in a tub or barrel of water until the rats are drowned, after which it may be readily re-placed within the base, as will be clearly understood.

It will be perceived that by this construction and arrangement of brooder house it constitutes substantially an air-tight, watertight, weather-proof and fire-proof structure for the comfort and protection of small chicks; that it furnishes the proper and uniform temperature; it protects the chicks from invasion by rats and other animals; it is portable and may be easily removed from place to place, it may be provided with any desirable number of inlets and outlets, and may be readily cleansed and kept in a wholesome and sanitary condition at all times.

It will be evident that my improved brooder house may be constructed of any suitable material or dimensions adapted to serve the special purpose intended, and that, if desired, its capacity may be materially increased by properly arranging therein a plurality of decks or tiers disposed above each other for the reception of small chicks.

It will be understood that the ventilating system hereinbefore described in connection with my improved brooder house, may also be readily installed and utilized in connection with dwelling houses, school houses, and other various types of building and structures where uniform and practical invention is desired or required.

Having thus described my invention what I claim and desire to secure by Letters Patent is:

1. A brooder house of the character described, comprising a plurality of sled runners, a metallic pan fixedly seated upon said runners, a series of joists disposed upon said pan, a flooring secured to the joists, an annular housing supported by said flooring, and a plurality of air inlets disposed within the housing adapted to receive fresh air from below the flooring and discharge the air near the upper part of the housing.

2. A brooder house of the character described, comprising a plurality of sled runners, a metallic pan fixedly secured to said runners, a plurality of joists seated upon said pan and forming a plurality of air conduits, a flooring secured to said joists having a central opening formed therethrough, an upright annular metallic housing fixedly secured upon said flooring, an upright air pipe disposed within the housing at each side thereof, each pipe communicating with an air conduit beneath the flooring, and a rearwardly disposed upright air pipe communicating with said central opening and another conduit beneath the flooring and leading to a central outlet formed in the roof of the housing.

3. A brooder house of the character described, comprising a metallic base, a series of joists disposed upon said base, a flooring secured to said joists, an annular housing supported by the flooring, a plurality of air inlets disposed within the housing adapted to receive fresh air from below the flooring and discharge the air near the upper part of the housing, and a central air outlet formed in said flooring communicating with a rear upright flue leading to a central air outlet at the top of the house.

4. A brooder house of the character described, comprising a hollow base portion and flooring, a housing supported by said flooring, a fresh air conduit formed in said base portion at each side thereof, an air flue communicating with each of said conduits adapted to discharge fresh air near the upper part of the housing, a central air outlet formed through the flooring, and a central air conduit formed beneath the flooring adapted to communicate with an upright flue leading to a central outlet at the top of the house.

5. A brooder house of the character described, comprising a hollow base portion having a fresh air conduit formed therein at opposite sides thereof, a flooring, an annular housing secured to the flooring, a central air outlet formed through the flooring adapted to communicate with a rear upright flue leading to a central air outlet, and an upright flue disposed at each side of said central outlet communicating with each fresh air conduit and discharging fresh air near the upper part of said housing.

6. A brooder house of the character described, comprising a hollow base portion provided with fresh air conduits and an upright air outlet communicating with each of said conduits, a flooring, a housing supported by said flooring, a central air outlet formed through the flooring, a central transversely disposed air conduit formed beneath the flooring, and an upright flue connected with one end of said central conduit and leading to a central outlet formed through the top of the house.

7. A brooder house of the character described, comprising a metallic pan base member, a series of joists disposed upon said pan, a flooring secured to the joists, a housing supported by said flooring, a plurality of fresh air conduits disposed between the joists, a fresh air upright flue adapted to communicate with each fresh air conduit and discharge fresh air at the upper part of the housing, a central air outlet formed through the flooring adapted to communicate with an air conduit below the flooring and with a rear upright flue leading to a central discharge outlet at the top of the housing, and a removably disposed rat trap secured within each of the fresh air conduits.

ELMER C. DICKEY.